Patented Aug. 14, 1928.

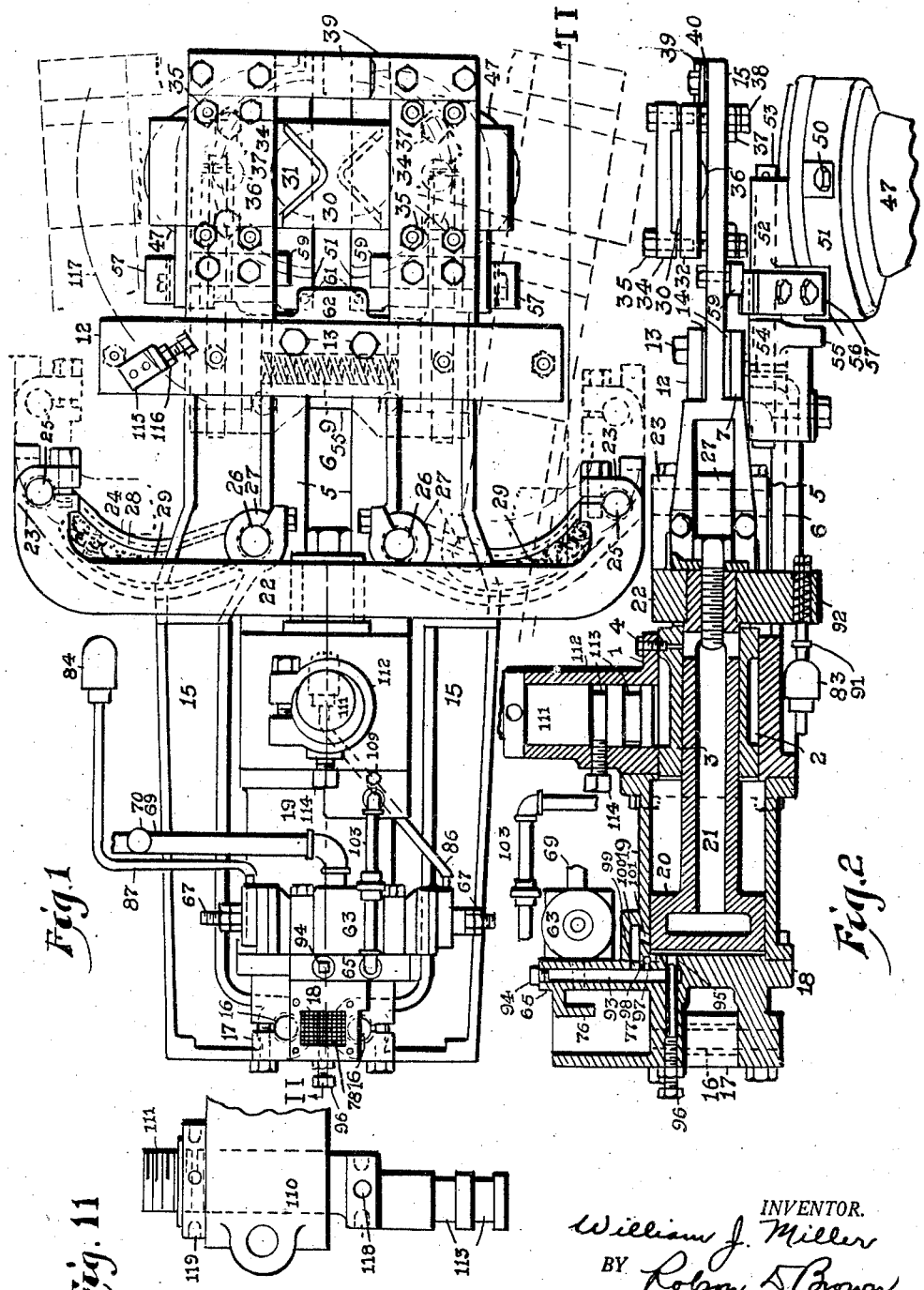

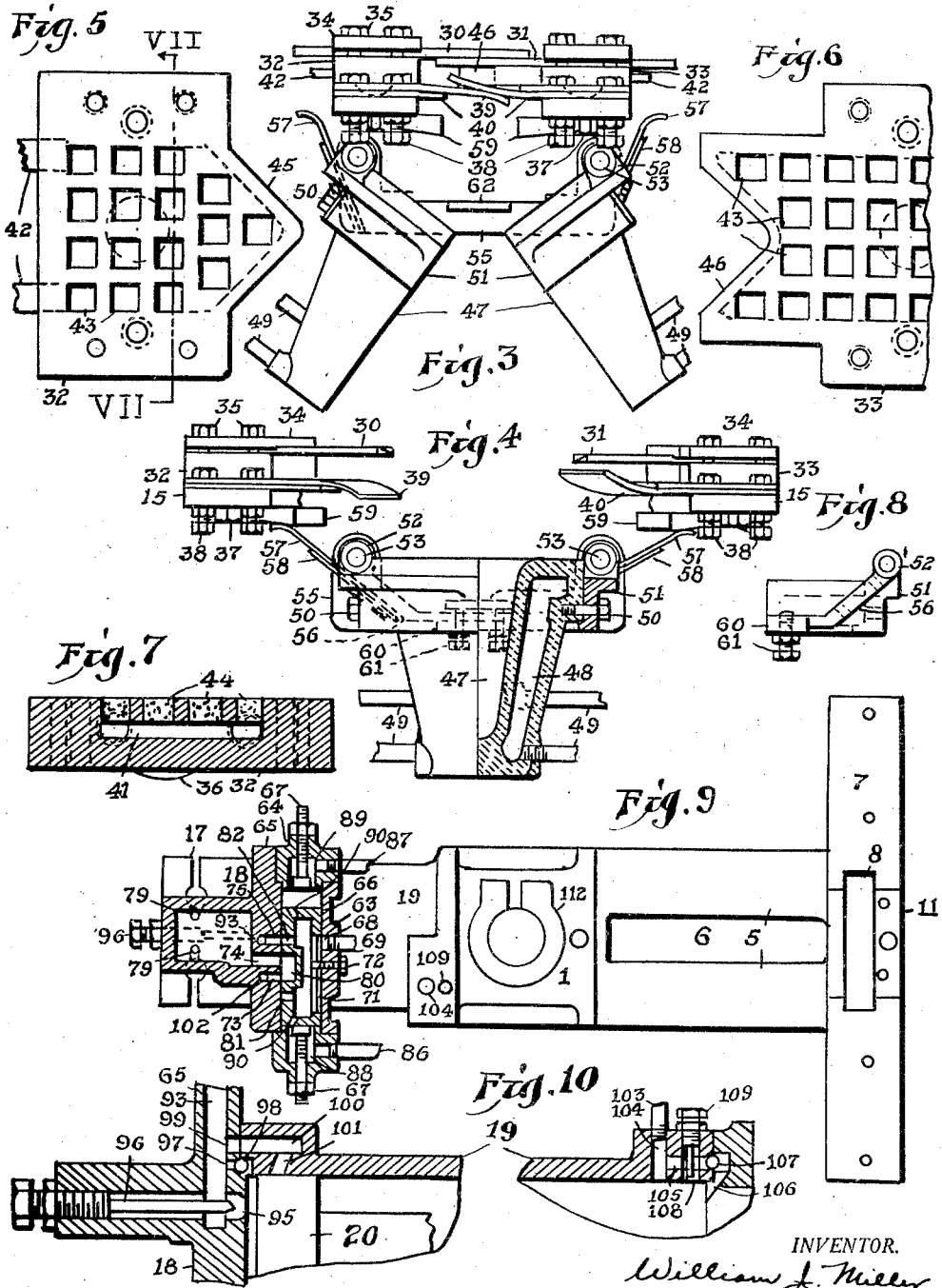

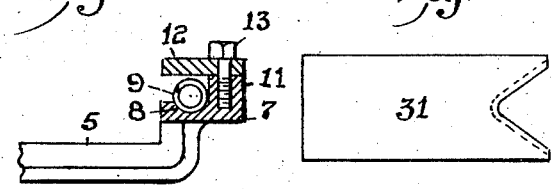
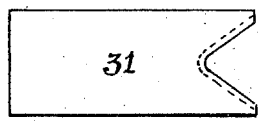
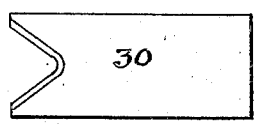
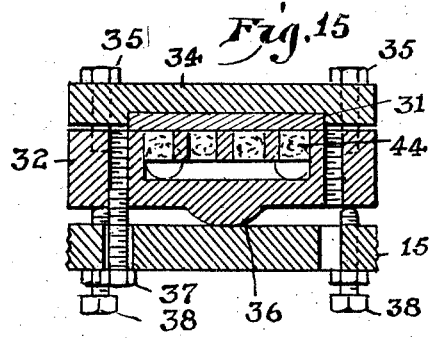
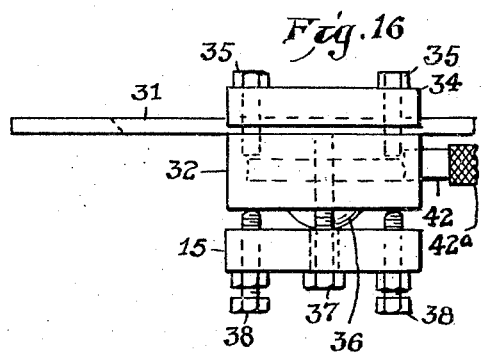

1,681,127

UNITED STATES PATENT OFFICE.

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE.

APPARATUS FOR PRODUCING MOLD CHARGES OF MOLTEN GLASS.

Application filed December 16, 1925. Serial No. 75,757.

In general my present invention relates to the production of mold charges of molten glass.

One important feature of my invention is a combination in a unitary structure of shear and shaping-cup mechanism whereby the molten glass is detached from the supply and shaped, and then deposited in the mold or other receptcle.

Another important feature of my invention is a new and improved shear mechanism.

Another important feature of my invention is a new and improved partible shaping-cup mechanism.

Another important feature of my invention is the provision of means for regulating and varying the speed of operation and of the moving parts of my apparatus.

Other novel features of construction and operation and also of arrangement of parts, will appear from the following description.

In the accompanying drawings, wherein I have illustrated the best embodiment of the principles of my invention now known to me, Fig. 1 is a plan view of a combined shear and shaping-cup mechanism embodying said principles, the shears being shown closed and the shaping-cup open; Fig. 2 is partially a side elevation thereof and partially a longitudinal section taken along the irregular line II—II in Fig. 1; Fig. 3 is a front elevation, looking from the right in Fig. 1, and showing the shears closed and the shaping-cup open; Fig. 4 is a similar view showing the shears open and the shaping-cup closed, one cup-part being in section; Fig. 5 is a top plan view on enlarged scale, of the supporting block of the upper shear blade and Fig. 6 is a similar but broken view of the supporting block of the lower blade; Fig. 7 is a sectional view taken along the line VII—VII in Fig. 5; Fig. 8 is a view of the hinge member of the shaping-cup part shown at the left in Figs. 3 and 4, the same in Fig. 8 being turned around 180° from its position in Figs. 3 and 4; Fig. 9 is a plan view showing the bed plate, the cylinder, the rear cylinder-head casting and the automatic valve, parts being shown in section to better illustrate the structure; Fig. 10 is an enlarged and broken longitudinal section of the cylinder and its heads; Fig. 11 is a detail showing the supporting standard for the mechanism; Fig. 12 is an enlarged sectional view through the cross-bar, the top guide bar and the spring seat; Figs. 13 and 14 are plan views of the two shear blades; Fig. 15 is an enlarged sectional view showing one of the shear blades and its mounting, and Fig. 16 is an end view of the same looking from the right in Fig. 15.

Referring to the drawings, the bed of the mechanism is a casting which has at one end a box 1 having a horizontally disposed bore 2 in which is inserted a bushing 3 secured in place as by the bolt 4. Extending forwardly from the bottom of box 1 is an integral rib 5 which is provided along its center with a longitudinal slot 6 for a purpose to be described. At its front end the rib 5 is curved upwardly and has integral therewith a transversely disposed cross-bar 7, provided at its center with a relatively shallow seat 8 disposed longitudinally of the cross-bar and of arcuate cross-sectional shape as shown in Fig. 12. 9 is a helical spring resting in said seat and protruding above the same, the extent of the spring's expansion being limited by the contact of the ends of the spring with the ends of the seat.

11 is a block integral with the cross-bar and positioned in front of the seat 8 but of less length. 12 is a top guide bar which is supported by the block 11 and secured thereto, as by the bolts 13. The bar 12 is thus spaced above the cross-bar 7 and is parallel thereto. 14 represents wear plates secured to the upper faces of the end portions of the cross-bar 7, the spaces between the wear plates and the under faces of the portions of top-bar 12 at either side of the block 11 forming guideways in which the shear levers 15 slide as they are opened and closed, said levers engaging the ends of the spring 9 as they approach their closed position, thus compressing said spring and storing power to produce a quick initial opening of the shear blades.

The shear levers, two in number, are disposed one on either side and longitudinally of the mechanism, as best shown in Fig. 1. The rear ends of said levers 15 are turned inwardly and provided with vertically disposed pin-holes which are engaged by the intermediate portions of pivot pins 16 whose upper and lower ends are clamped in split collars 17 integral with the rear casting 18, a pair of said collars being provided at either side of said casting.

19 is a horizontally disposed fluid-pressure cylinder whose front end is bolted to the box 1 of the bed plate, the bushing 3 forming the front cylinder-head, while the casting 18 is bolted to the cylinder 19 and forms its rear head.

20 is a piston working in said cylinder and attached to or integral with a piston-rod 21 which protrudes through the bushing 3.

The outer end of the piston-rod 21 is fixed to the center of a cross-head 22 whose outer ends are curved forwardly and provided with pairs of upper and lower split collars 23 between which are inserted the pierced outer ends of the links 24 which are pivotally attached to the cross-head by pins 25 which extend through the ends of the links and have their ends clamped in said split collars.

The inner ends of said links extend into transversely disposed openings in the shear levers 15 and are pivotally connected therein by pins 26 which extend through holes in the links and have their ends clamped in the upper and lower split collars 27 of the levers 15.

The upper surfaces of the links are provided with seats 28 which are upwardly contracted in cross section so as to hold in place fillers 29 of felt which are kept saturated in oil so as to keep the parts in sliding contact properly lubricated.

It is evident that when the piston 20 retreats in the cylinder 19, the cross-head 22 is drawn rearwardly and the shear levers 15 are caused to move toward each other and assume the closed position illustrated in solid lines in Fig. 1. Likewise, as the piston advances in the cylinder, the cross-head is moved outwardly and the shear-levers are caused to assume the separated or open positions indicated in dotted lines in Fig. 1.

30 and 31 represent the two shear-blades which are formed of suitable steel and preferably have their coacting cutting edges notched, as shown in Figs. 13 and 14 so as to complete the cut at the vertical axis of the neck of glass by which the mold charge depends from the feeder orifice in automatic feeding or from the punty in hand feeding.

Said blades are secured respectively on the supporting blocks 32 and 33, as by means of clamp plates 34 which cross over the blades and have their ends secured to the blocks as by the bolts 35.

The lower faces of the supporting blocks are provided with central rounded bosses 36 as shown in Figs. 15 and 16, which bear on the shear-levers 15, each block being attached to the shear levers by two bolts 37 alined longitudinally of the shear-lever and with the axis of the boss 36. Four adjustment screws 38 are screwed up through threaded holes in the shear-lever and impinge against the under face of the supporting block near its corners. The bolts 37 extend up through loosely fitting holes in the shear arms and are screwed into threaded holes in the blocks, as shown in Fig. 15. When the screws 38 have been properly adjusted to give the desired angular relation of the block to the shear arm, the bolts 37 are tightened in the threaded holes in the block until the bolt heads bear tightly against the lower surface of the shear arm, thus locking the block in its adjusted position relative to the shear arm. Thus the supporting blocks may be adjusted by tilting on their rounded bearings to aline and position the shear blades so that they will properly pass in sliding contact as the shears close.

It is desirable to obtain resilient pressure between the shear blades and this is provided for by means of the two spring arms 39 which are mounted on the shear-levers 15 in front of the shear blades and have oppositely curved ends, so as to insure their mating as the shears close. The arms 39 may be advantageously straightened by the shorter leaf-springs 40 mounted in unison with the arms 39.

Means are provided for properly cooling the shear blades, said means operating through the evaporation of moisture applied to the under surfaces of the blades.

Thus the blocks 32 and 33 are provided with interior chambers 41 to which a supply of water is maintained through the pipe connections 42 to which are attached the flexible hose shown at 42ª in Fig. 16. The top wall of said chambers is provided with a plurality of ports 43 which contain fillings of felt 44 which is thus kept moist and the moisture is thus applied to the under surface of the shear blades.

As it is desirable to apply moisture to the greatest possible area of the shear blades and as close up to the cutting edges as possible, the block 32 which carries the upper shear blade 30 is provided with a triangular extension 45 which approaches but does not reach the apex of the notch of the shear blade 30 and past which the points of the lower shear blade 31 pass in assuming its closed position. For the same purpose the block 33 which carries the lower shear blade 31 is provided with a notched extension 46 which extends forwardly under the forwardly extending portions of the shear blade 31 but is stepped back from the cutting edge.

The shaping-cup is shown as of the partible type and is comprised of the two halves 47 which are supported to swing on horizontal axes, the axes of movement being so placed, as shown in Figs. 3 and 4, that the cup-halves, when free, swing outwardly into and maintain their separated or open positions shown in Fig. 4.

The cup-halves have internal cooling chambers 48 in their walls through which a current of water is maintained by means of the flexible pipes 49.

Each cup-half is secured, as by a screw-bolt 50 in a hinge-member 51, the two hinge-members being complementary to each other and provided at the tops with horizontally disposed sleeves 52 which are rotatably mounted on the outer or front ends of a pair of pivot shafts 53 whose rear ends are pinned or otherwise fixed in horizontally disposed sleeves 54 integral with either side of a bracket-plate 55 which is bolted to the under side of the bed-rib 5.

It is evident that the outward setting of the axes upon which the cup-halves swing, has the result that the latter, when freed, will automatically open and discharge their contents and remain open until closed by mechanism devised for that purpose.

The means shown for closing the cup-halves together is as follows. Each hinge-member is provided with an inclined surface 56 against which is bolted a spring lever 57 whose free end extends upward and outwardly, substantially as shown, and is provided with a curved extremity. The levers are preferably stiffened and strengthened by a supplementary leaf-spring 58.

The levers 57 are so disposed that as the shear-levers 15 separate, after severing the neck of a mold charge, the upper ends of the levers are engaged by cam surfaces 59 on the lower faces of the shear levers, causing the upper ends of the levers 57 to swing downwardly and outwardly, and thus turning the cup-halves from their open positions, shown in Fig. 3, into their closed positions, shown in Fig. 4, thus closing the cup in position to receive the next mass of molten glass to be deposited therein.

It is evident that when the shear-levers are returned to their closed position, thus causing the neck of the mold charge to be severed, the cam surfaces 59 will move out of engagement with the spring levers 57, and gravity will cause the cup-halves to swing from their closed positions shown in Fig. 4 into their open position shown in Fig. 3, thus opening the cup and discharging the mold charge in the waiting mold or other receptacle.

To properly position the cup-halves in their closed positions and to enable slight irregularities of parts to be properly compensated for I provide each of the hinge-members with a projection 60 having a threaded hole up through which is screwed an abutment screw 61 whose protruding end engages from below a lip 62 extending forwardly from the center of the bracket-plate 55. Thus by adjusting the bolts 61 the cup-halves may be adjusted to properly close together, the resiliency of the spring levers 57 making practical such adjustment.

An automatic valve is provided for controlling the admission of fluid presure to and its relief from the cylinder 19. The same may be conveniently mounted on the rear end of the cylinder.

Thus 63 is the valve casing of substantially cylindrical shape having its ends closed by the heads 64, and its rear side by the upwardly extending plate 65 integral with the rear casting or cylinder head 18 to which the casing 63 may be bolted. 66 is the hollow valve body slidable in the casing 63, the extent of its movement in either direction being adjustable by means of abutment screws 67 screwed through threaded holes in the casing heads.

The front side of casing 63 is provided with a port 68 which is connected to the compressed air supply pipe 69, which pipe is provided in the usual manner with a device, indicated at 70, for introducing a limited amount of oil spray into the compressed air for the purpose of lubricating the valve and also the fluid pressure cylinder and its piston.

The front side of the valve body 66 is provided with a longitudinal slot 71 always in registration with the port 68, so that a supply of compressed air is maintained within the valve body at all times. 72 is a screw extending through a threaded hole in the casing and engaging said slot to prevent rotation of the valve body.

73, 74 and 75 represent three ports in the plate 65 leading from the interior of the casing. Said ports are alined horizontally and the central port 74 which is positioned at the center of the casing extends through the plate and has its outer end open beneath a depending hood or deflector 76 which extends down into a well 77 which may be formed integrally with the casting 18 and which has its top closed by a removable wire screen 78. Small passages 79 lead downwardly at diverging angles from the bottom of the well 77 to the lower ends of the bores of the upper split collars 17, thus supplying oil to the hinge pins 16 upon which the shear levers 15 are hinged. The port 74 is an open exhaust port for the relief of pressure from the cylinder ends through the automatic valve and the same is always in communication with a recess or chamber 80 in the side of the valve body 66. The ports 73 and 75 are spaced equally to either side of the central or relief port 74 at such distance therefrom that the recess 80 will connect one or the other of said ports to the central exhaust port 74. The rear wall of the valve body is provided with a pair of ports 81 and 82 connected to its chambered interior and thus always in communication with the constant supply of compressed air. The ports 81 and 82 are so located that when the valve is shifted to one limit of its movement the port 82, as shown in Fig. 9 is in registration with the port 75, while the recess 80 connects the port 73 to the relief port 74. Likewise when the valve body is shifted to the other end of its path of movement, the port 81 is in registration with the port 73 while the port 75 is connected to the relief port 74 by the recess 80.

The valve body is shifted in the casing by means of the spring-closed bleeder valves 83 and 84 of well known construction, which are connected by pipes 86 and 87, respectively, to the passages 88 and 89, respectively, in the opposite casing heads. The end walls of the valve body 66 are provided with the usual restricted passages 90 for the reestablishment of pressure in the ends of the casing.

The port 75 is connected, in the manner later described herein, to the rear end of the fluid pressure cylinder 19 while the port 73 is connected to the front end of said cylinder, so that when the valve body 66 occupies the position shown in Fig. 9, pressure is being admitted to the rear end of the cylinder and relieved from the front end thereof, thus causing the shears to open. When the valve body is shifted to the opposite end of the valve casing pressure is admitted to the front end of the cylinder and relieved from the rear end thereof, thus causing the shears to close.

The bleeder valve 83, which, when opened, causes the valve body to shift into the position shown in Fig. 9 is attached to the under side of the box 1 in the path of the rearward travel of a spring finger 91 carried by a projection 92 depending from the cross-head 22, and therefore as the piston completes its inward stroke and the shears complete their severing operation, the opening of the bleeder valve 83 causes the automatic valve to shift, and the piston to start forwardly, thus causing the shears to open. As soon as the pressure is relieved from the front of the piston through the opening of the bleeder valve 83, the spring 9 causes a quick initial opening of the shears.

The bleeder valve 84 is actuated at the proper time, either automatically, such for instance as by the timer shown and described in Letters Patent of the United States No. 1,540,894 or No. 1,549,206, thereby causing a reversal of the automatic valve so that the travel of the piston in the cylinder is again reversed and the shears are again closed. If desired, as is usual in hand feeding, the bleeder valve 84 may be operated by the operator who feeds the masses of glass to the shears and shaping-cup.

The speed of travel of the piston in either direction, in opening and closing the shears, may be regulated by the proper abutment screw 67 screwing in or out, thus adjusting the extent of registration of the valve ports. A full registration will admit and relieve pressure at full volume, thus causing maximum speed of piston travel, while by adjusting the proper abutment screw to obtain an incomplete registration restricted to the proper degree, the speed of piston travel in either direction may be nicely regulated.

I also provide means for cushioning the ends of the strokes of the piston to prevent the jars of sudden stoppages and reversal. I am thus enabled to slow down the movement of the shear blades during the cutting operation which is advantageous in mold charge formation, as it enables the production of an upper tapered end to the mold charge or gob.

I produce this cushioning or slow-down by restricting the pressure relief from the path of the moving piston as it approaches the end of a stroke.

The embodiment of this feature illustrated in the drawings is as follows.

Referring first to the fluid-pressure connections of the rear end of the cylinder 19, the port 75 of the automatic valve extends into the plate 65 and connects with a vertical passage 93 in the plate 65 whose upper end is closed by the screw plug 94 and whose lower end is connected by a port 95 in the end casting 18 with the interior of the cylinder 19. A needle valve 96 is provided to adjust the capacity of the port 95. A second port 97 in the end casting 18 also connects the passage 93 with the interior of the cylinder, and said port is provided with a ball valve 98 which is arranged to freely admit fluid pressure to the cylinder but to prevent escape of fluid pressure from the cylinder. A third port 99 connects the passage 93 with a horizontal passage 100 cast in the wall of the cylinder and whose front end is provided with a port 101 leading into the interior of the cylinder.

It is evident that when the piston 20 is at the end of its rearward stroke, the reversal of the automatic valve will admit fluid pressure through the passage 93 and past the ball valve 98, thus starting the piston on its forward movement.

However, when the piston is moving rearwardly in the cylinder, and the passage 93 is connected through the automatic valve to atmosphere to relieve the pressure in the path of the moving piston, the pressure escapes through the ports 101 and the valved port 95, while the ball valve 98 closes the port 97. As the piston approaches the end of its rearward movement, it seals the port 101 and the only escape for the pressure is through the port 95 whose capacity may be nicely adjusted by means of the needle valve 96. Thus the restricted escape of pressure in the path of the moving piston produces a slowing up or cushioning effect on the piston which prevents a sudden jar, such as would result were the piston moving at unreduced speed when it reached the end of its stroke.

As the shear-blades are closed together by the rearward movement of the piston, it is possible by the adjustment of the needle valve 96 to obtain with great accuracy the desired closing movement of the shears with the consequent variations in shaping the ends of the mold charges or gobs.

I also provide a similar means for cushioning the forward movement of the piston. Thus the port 73 of the automatic valve is connected to a vertical passage 102 in the plate 65 and the upper end of said passage is connected by a pipe 103 with a port 104 in the top wall of the cylinder 19 near its front end. The port 104 communicates with the interior of the cylinder 19 and is so located as to be covered and sealed by the piston as the latter approaches the end of a forward movement. The port 104 is also connected with a passage 105 in the cylinder wall leading forwardly to the end of the cylinder and connected with the interior of the cylinder by a port 106 which is sealed against escaping pressure from the cylinder by the ball valve 107, which valve however does not interfere with the entrance of pressure into the cylinder through the port 106. The passage 105 is also connected, near its front or ball-valved end, by a port 108 leading into the cylinder and provided with the adjustable needle valve 109.

It is evident that the ball valve 107 will permit the free entrance of pressure against the piston to start its rearward movement, but as the piston approaches the extremity of a forward movement, it will seal the port 104 and the escape of pressure from the path of the cylinder will close the ball valve 107, so that the only relief for the pressure in the path of the piston, as the latter approaches the end of the stroke is through the port 108 whose capacity may be nicely adjusted by the needle valve 109. Thus, by adjusting the needle valve I am enabled to produce the desired slow down of the piston movement, and thus cushion the completion of its stroke.

I show means for mounting my improved feeding or mold-charge producing mechanism in place beneath the discharge orifice or outlet of a supply receptacle for molten glass, such as the shallow extension or boot of a glass tank.

Thus 110, Fig. 11, represents a split collar on the steel support or frame work of the furnace boot or any other suitable fixed support which is properly located.

In said collar is clamped the upper end of a standard 111 whose lower end is inserted in a split collar 112 mounted on and integral with the top of the box 1. It is evident that by tightening the split collar 112 the shear and shaping-cup mechanism will be firmly supported in position. I prefer to provide the lower end of the standard 111 with one or more circumferential grooves 113 which may be engaged by the set screw or screws 114 screwed through threaded holes in the collar. I am thus enabled to preliminarily support the mechanism in place before tightening the split collar 112, thus rendering the mechanism temporarily rotatable with the standard 111 as an axis. Thus the mechanism may be mounted on the standard in a position extending out from the boot, and it then may be swung into position beneath the feeder outlet and be clamped in position by tightening the collar 112.

In Fig. 1, I have shown a bracket 115 bolted on the guide bar 12 and provided with an adjustable abutment screw 116 which may be regulated to strike against the side of the furnace boot, indicated in dotted lines at 117 in Fig. 1, thus providing a convenient limiting stop to automatically halt the mechanism with the vertical axis of the shaping cup properly centered with the feeder outlet. Thus, when the abutment screw 116 has been properly adjusted, at any time that repairs or replacements are to be made or the mechanism is to be temporarily put out of commission, the collar 112 may be loosened and the unitary mechanism may be swung, with the standard 111 as an axis, out from under the boot 117. When it is desired to put the mechanism back into its operative position, it is swung in the reverse direction until the abutment screw 116 impinges against the boot 117, thus halting the mechanism in its properly centered position. The collar 112 is then tightly clamped on the standard 111. The abutment screw may be positioned at either end of the plate 12 thus permitting the mechanism to be swung in either direction.

To enable the position of the standard 111 to be adjusted to suit mechanisms of different proportions or dimensions, and also to properly adjust the position and center the mechanism horizontally, I prefer to make the lower portion of the standard 111 eccentric to the upper portion, as shown in Fig. 11, so that the lower end of the standard may be properly positioned to support the particular mechanism in view. The standard is shown provided with spanner holes 118 to facilitate its turning in the collar 110.

I further provide means for raising and lowering the mechanism on its support, thus providing for vertical adjustment.

Thus I tread the upper end of the standard 111 and screw thereon a supporting nut 119 which bears down on the top of the collar 110.

Thus I may loosen the collar 110 slightly and adjust the nut 119 up or down to position the mechanism in the proper horizontal plane.

What I desire to claim is:—

1. In apparatus for producing mold charges of molten glass, the combination of severing means, a receptacle beneath the severing means, and resilient contact means whereby the retraction of the severing means after a severing operation causes the receptacle to assume its receptive position.

2. In apparatus for producing mold charges of molten glass, the combination of shears for cutting the glass, a partible receptacle beneath the shears and comprised of parts mounted to move toward and away from each other, and intermittently effective means whereby the opening of the shears causes the receptacle parts to move toward each other to complete the receptacle, said receptacle parts being released and being arranged to separate by gravity as the shears cut.

3. In apparatus for producing mold charges of molten glass, the combination of shears for cutting the glass, a receptacle beneath the shears and comprised of parts movably supported in such manner as to separate by gravity when free, and means whereby the opening of the shears causes the receptacle parts to move toward each other and complete the receptacle, said parts being released and opening by gravity as the shears move toward their closed position.

4. In apparatus for producing mold charges of molten glass, the combination of shears for cutting the glass, a receptacle composed of parts, movable supports for the receptacle parts and upon which the receptacle parts are detachably mounted, and means whereby when the shears open said supports are caused by resilient pressure to converge to complete the receptacle and when the shears close the supports diverge parting the receptacle.

5. In apparatus for producing mold charges of molten glass, the combination of shears for cutting the glass, a receptacle composed of parts, movable supports for the receptacle parts and upon which the receptacle parts are detachably mounted, means whereby when the shears open said supports are caused by resilient pressure to converge to complete the receptacle and when the shears close the supports diverge parting the receptacle, and adjustable means for limiting the converging movement of said supports.

6. In apparatus for producing mold charges of molten glass, the combination of shears for cutting the glass, a partible receptacle to receive the glass below the shears, the receptacle parts being swingingly mounted and arranged to diverge by gravity to part the receptacle when released, and means whereby when the shears open said parts are resiliently forced to converge.

7. In shear mechanism for severing mold charges, the combination of a fluid-pressure cylinder, piston and piston-rod mechanism, a pair of shear levers disposed at either side of said cylinder and having their rear ends pivotally attached adjacent to the rear end of the cylinder, cutting edges carried by the free ends of said levers, a transversely disposed cross-head carried by the piston rod and extending beyond the levers, and a link pivotally attached at each end of the cross-head and having its inner end pivotally connected to the adjacent lever.

8. In shear mechanism for severing mold charges, the combination of a fluid-pressure cylinder, piston and piston-rod mechanism, a pair of shear levers disposed at either side of said cylinder and having their rear ends pivotally attached adjacent to the rear end of the cylinder, cutting edges carried by the free ends of said levers, a transversely disposed cross-head carried by the piston rod and extending beyond the levers, a link pivotally attached at each end of the cross-head and having its inner end pivotally connected to the adjacent lever, and means for lubricating the portions of the cross-head and links which are in sliding contact.

9. In shear mechanism for severing mold charges, the combination of a fluid-pressure cylinder, piston and piston-rod mechanism, a pair of shear levers disposed at either side of said cylinder and having their rear ends pivotally attached adjacent to the rear end of the cylinder, cutting edges carried by the free ends of said levers, a transversely disposed cross-head carried by the piston rod and extending beyond the levers, a link pivotally attached at each end of the cross-head and having its inner end pivotally connected to the adjacent lever, and lubricant carrying means interposed between the links and the cross head.

10. In shear mechanism for severing mold charges, the combination of shear levers, means for causing said levers to converge and diverge, a pair of shear blades arranged to be brought into cutting relation by the convergence of the levers, supporting members to which said blades are attached, said members being carried by and having rolling contact with the levers so that their position relative to the latter may be adjusted by tilting on their rolling contact, abutment screws positioned on opposite sides of the contacts for tilting the members relative to the levers, and means for fixing the members in their adjusted positions relative to the levers.

11. In shear mechanism for severing mold charges, the combination of shear levers, means for causing said levers to converge and diverge, a pair of shear blades arranged to be brought into cutting relation by the convergence of the levers, supporting members to which the shear blades are attached, said members being carried by the levers and having ball-shaped boss contact therewith so as to permit adjustment by tilting them relative to the levers, and means for fixing the members in their adjusted positions relative to the levers.

12. In shear mechanism for severing mold charges, the combination of shear levers, means for causing said levers to converge and diverge, a pair of shear blades arranged to be brought into cutting relation by the convergence of the levers, supporting members to which the shear blades are attached, said members being carried by the levers and having ball-shaped boss contact therewith so as to permit adjustment by tilting them relative to the levers, mechanical means for tilting the members on said contacts for the purpose of adjustment, and means for fixing the members in their adjusted positions relative to the levers.

13. In shear mechanism for severing mold charges, the combination of shear levers, means for causing said levers to converge and diverge, a pair of shear blades arranged to be brought into cutting relation by the convergence of the levers, supporting members to which the shear blades are attached, said members being carried by the levers and having rounded boss contact therewith so as to permit adjustment by tilting them relative to the levers, abutment screws interposed between the members and the levers for tilting the members relative to the levers to adjust the former, and means for fixing the members in their adjusted positions.

14. In shear mechanism for severing mold charges, the combination of shear levers, means for causing said levers to converge and diverge, a pair of shear blades arranged to be brought into cutting relation by the convergence of the levers, supporting members to which the shear blades are attached, said members being carried by the levers and having rounded boss contact therewith so as to permit adjustment by tilting them relative to the levers, abutment screws interposed between the members and the levers for tilting the members relative to the levers to adjust the former, and clamping bolts to fix the members in their adjusted position.

15. In shear mechanism for severing mold charges, the combination of blade-supports, shear-blades mounted on said supports, pads of moisture retaining material carried by said supports in contact with the surfaces of said shear-blades, and means for supplying a moistening liquid to said pads.

16. In shear mechanism for severing mold charges, the combination of blade supports having openings in their supporting surfaces, shear-blades mounted on said supports, felt fillers for said openings, and means for supplying water to said fillers.

17. In shear mechanism for severing mold charges, the combination of blade supports provided with interior chambers, means for maintaining a supply of water to said chambers, shear-blades mounted on said supports, apertures through the walls of said chambers to admit moisture to the surfaces of the shear-blades, and felt fillers for said apertures.

18. A mounting for supporting mold charge-producing mechanism in position beneath the discharge outlet of a glass furnace, which comprises a vertically disposed standard supported to be rotated and to be fixed in position, said support being provided with an eccentric portion to which the mechanism is secured, whereby by rotating said support the position of the mechanism may be adjusted horizontally.

19. A mounting for supporting mold charge-producing mechanism in position beneath the discharge outlet of a glass furnace, which comprises a vertically disposed standard supported to be rotated and to be fixed in position, said support being provided with an eccentric portion, means for rotatably attaching the mechanism to the eccentric portion of said support, and means for limiting the rotary movement of the mechanism relative to the discharge outlet and on said support as an axis.

20. A mounting for supporting mold charge-producing mechanism in position beneath the discharge outlet of a glass furnace, which comprises a vertically disposed standard supported to be rotated and to be fixed in position, said support being provided with an eccentric portion, means for rotatably attaching the mechanism to the eccentric portion of said support, and means for fixing the mechanism relative to the discharge outlet and on said support as an axis.

21. In apparatus for producing mold charges of molten glass, the combination of shears for cutting the glass, a partible receptacle beneath the shears and comprising parts mounted to move from their closed position by gravity, and means moving in unison with the shears and arranged to temporarily engage the receptacle parts as the shears open and to move said parts into and hold them in their closed position, said means being disengaged from the receptacle parts as the shears move toward their closed position whereby the receptacle parts are released and open.

22. In apparatus for producing mold charges of molten glass, the combination of shears for cutting the glass, a partible receptacle beneath the shears and comprising parts mounted to move from their closed position by gravity, said receptacle parts being provided with contact members, and means moving in unison with the shears and arranged to temporarily engage said contact members as the shears open and move said receptacle parts into and maintain them in their closed position, said means being disengaged from said contact members as the shears move toward their closed position whereby the receptacle parts are released and open.

Signed at Pittsburgh, Pa., this 25th day of November, 1925.

WILLIAM J. MILLER.